United States Patent [19]

Edwards et al.

[11] Patent Number: 5,341,447
[45] Date of Patent: Aug. 23, 1994

[54] INSERT FOR POSITIONING AN OPTICAL FIBER AND AN OPTICAL FIBER CONNECTOR FOR USE THEREWITH

[75] Inventors: Bryan T. Edwards, Camp Hill; David D. Erdman, Hummelstown; Kevin T. Monroe; David L. Stakem, both of Harrisburg, all of Pa.

[73] Assignee: The Whitaker Corporation, Wilmington, Del.

[21] Appl. No.: 27,980

[22] Filed: Mar. 8, 1993

[51] Int. Cl.5 .................................................. G02B 6/26
[52] U.S. Cl. ............................................ 385/81; 385/76;
385/77; 385/80; 385/84
[58] Field of Search ..................... 385/70, 76, 77, 81, 385/86, 87, 80, 84

[56] References Cited

U.S. PATENT DOCUMENTS

| | | | |
|---|---|---|---|
| 4,133,601 | 1/1979 | Le Guen et al. | 385/81 X |
| 4,355,862 | 10/1982 | Kock | 385/81 X |
| 4,391,487 | 7/1983 | Melman et al. | 385/81 X |
| 4,440,469 | 4/1984 | Schumacher | 385/81 X |
| 4,674,833 | 6/1987 | Des Forges et al. | 385/81 X |
| 4,679,895 | 7/1987 | Huber | 385/87 |
| 5,080,460 | 1/1992 | Erdman et al. | 385/81 |
| 5,088,804 | 2/1992 | Grinderslev | 385/81 |
| 5,107,536 | 4/1992 | Wall | 385/81 |
| 5,125,059 | 6/1992 | Wall | 385/81 |
| 5,140,662 | 8/1992 | Kumar | 385/81 |

*Primary Examiner*—Brian Healy
*Attorney, Agent, or Firm*—Driscoll A. Nina, Jr.

[57] ABSTRACT

An elastic insert for receiving and securing an optical fiber within a passage of a housing, such as a ferrule of an fiber optic connector, when compacted therein by a plunger, the insert having deformable relief regions that are constructed to deform upon compaction so that the optical fiber is securely held by the insert, while controlling the forces exerted outwardly by the insert against the housing along the passage and a fiber optic connector for use with the insert.

14 Claims, 5 Drawing Sheets

INSERT FOR POSITIONING AN OPTICAL FIBER AND AN OPTICAL FIBER CONNECTOR FOR USE THEREWITH

BACKGROUND OF THE INVENTION

Field of the Invention

The invention relates to holding an optical fiber of an optical fiber cable within an optical connector.

U.S. Pat. No. 5,080,460 discloses an optical fiber connector and is assigned to the assignee of the present invention. The connector of the '460 patent includes a compactable insert within a passage of an alignment ferrule for radially positioning an optical fiber extending therethrough relative the alignment ferrule. A plunger is force fit into the passage, compacting the insert into a constriction and causing the insert to concentrically grip the optical fiber.

The concentric gripping occurs because the ends of the insert are being compacted between the constriction and the plunger which would tend to bulge the middle of the insert. However, the insert is within the passage and constrained from bulging by the ferrule resulting in the insert collapsing upon, and concentrically gripping, the optical fiber. Compaction beyond initial engagement with the optical fiber produces stored energy within the insert. As the amount of compaction increases so does the amount of stored energy.

The stored energy causes the insert to continually exert an expansionary force in all directions. While some stored energy is helpful to maintain engagement with the optical fiber over time, excessive expansionary force may distort the front portion of the ferrule corresponding to the insert or allow the grip on the fiber to be lost by dislodging the plunger from its engagement with the ferrule.

The stored energy may be accommodated by overdesigning the associated components. Stronger materials may be used or, where possible, the associated dimensions may be increased. These accommodations have trade-offs, for example, stronger materials may also be more difficult to form and additional material may add additional cost.

As the use of optical fiber connectors increases, it is necessary to provide more optimally designed connectors. Optimization of the type of connector disclosed in the '460 patent requires an insert capable of gripping the optical fiber concentrically while storing enough energy to accommodate dimensional fluctuations. However, the stored energy must be controlled so that it does not exert excessive expansionary force on the adjacent components. Although possible, it would be impractical to control the amount of energy stored within an insert of an assembled connector by tightly controlling the tolerances of the mating components. What is needed is an insert manufactured to limit expansionary force while still providing radial alignment and concentric gripping of the optical fiber.

SUMMARY OF THE INVENTION

The present invention is a compactable insert for securing an optical fiber within a passage of a housing, such as an alignment ferrule, while preventing excessive expansionary force of the insert from being exerted against associated components. The insert secures the optical fiber by being compacted between a constriction of the passage and a plunger movable within the passage. The insert includes an elastic body with a relief region that deforms for controlling expansionary forces of the insert from energy being stored therein as a result of compaction. The insert further includes a bore within the body for receiving the optical fiber in a sliding fit when the insert is uncompacted and, when the insert is compacted, in a tightly engaged fit by exerting compressive forces thereupon.

It is an object of this invention to provide an insert that maintains a tight and concentric engagement with an optical fiber when compacted within a passage of a housing while limiting the amount of expansionary force exerted by the insert against associated components.

It is a feature of this invention that a relief region is incorporated into the insert and that the relief region deforms as the insert is compacted thereby limiting the expansionary force the insert may exert on mating components while still maintaining a tight grip on the optical fiber.

It is an advantage of this invention that the relief region may be a longitudinal channel or a radial channel disposed upon the outside of the insert or the relief region may be a blind tubular channel extending into the insert from one end. It is another advantage that adhesive may be used with the insert of the present invention as the plunger can compress adhesive along the longitudinal channels to the region in front of the insert to provide enhanced engagement of the fiber.

DETAILED DESCRIPTION OF THE INVENTION

Figure 2:
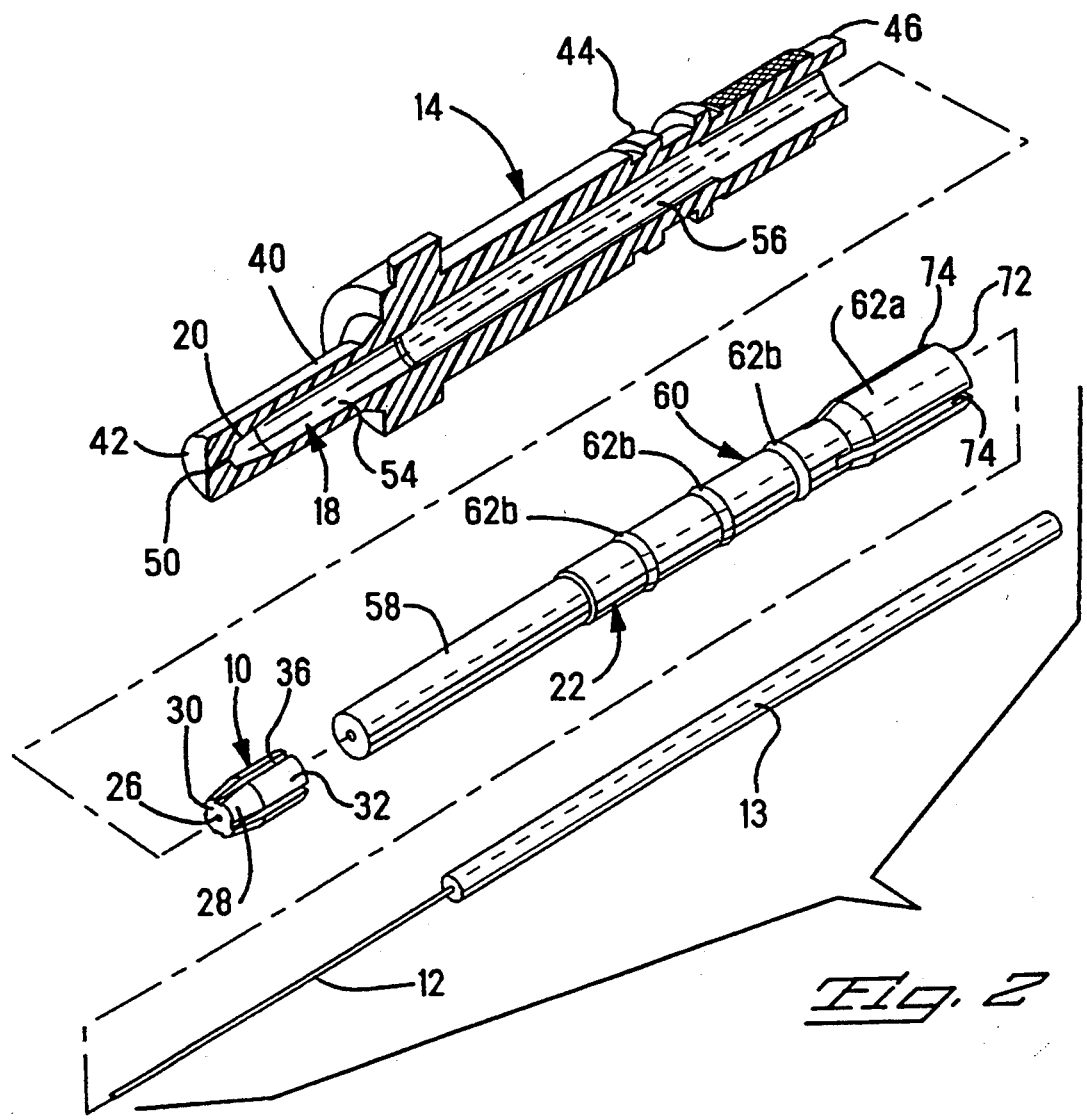
FIG. 2 is a partial exploded perspective view of a buffer covered optical fiber and the connector of FIG. 1.

The present invention is a compactable insert 10 that positions an optical fiber 12 within a housing 14 while limiting the magnitude of the expansionary forces the insert 10 may exert on housing 14. The housing 14 could be, but does not have to be, a ferrule of an optical fiber connector. As illustrated in FIG. 2, the insert 10 fits within a passage 18 of a housing 14 and is compacted into a constriction 20 of the passage 18 by a plunger 22. The optical fiber 12 extends through the plunger 22, the insert 10 and the housing 14. As the insert 10 is compressed it undergoes a deformation that results in a reduction in cross-section in specific areas, thereby engaging the fiber 12 concentrically within the housing 14.

Figure 3:
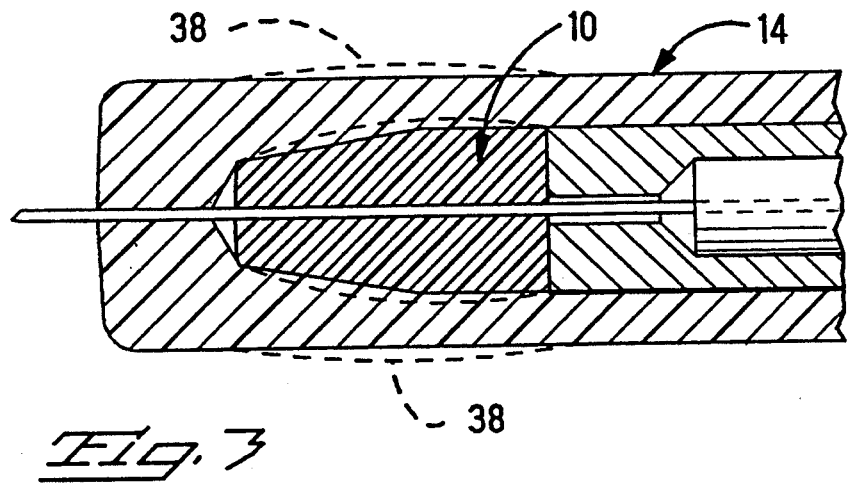
FIG. 3 is a cross section showing the bulge of the forces exerted by an insert without the relief regions.

FIGS. 3–10 show various embodiments of the present invention. The insert 10 has a body 24 with a fiber receiving bore 26 extending therethrough in a concentric relationship with a frustoconical surface 28 at a front end 30 and a cylindrical surface 32 at a rear end 34. The insert 10 has relief regions 36 for controlling expansion forces of the insert 10 as it is compacted. As shown in FIG. 3, for an insert 10 without the relief regions, the expansionary forces tend to bulge out against the housing 14, as represented by the dashed lines 38. The insert 10 may be formed from a molded plastic material, closed or open cell foam or it may be formed from other elastic materials using other manufacturing methods.

Figure 4:
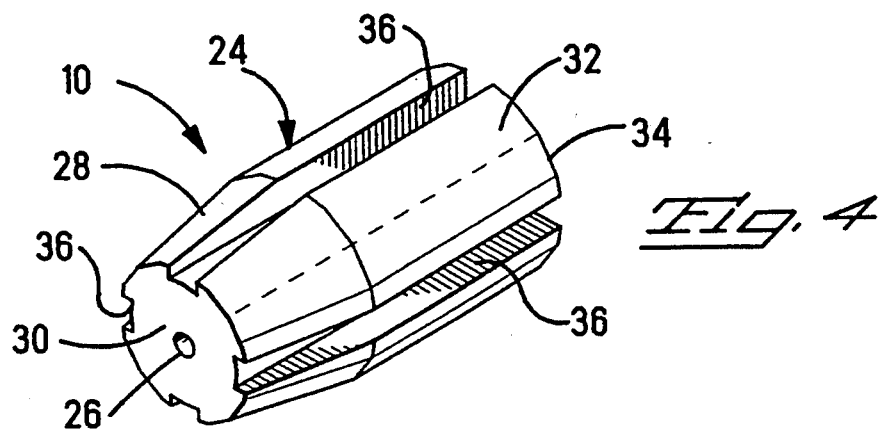
FIG. 4 is a perspective view of one embodiment of the insert of the present invention.
Figure 5:
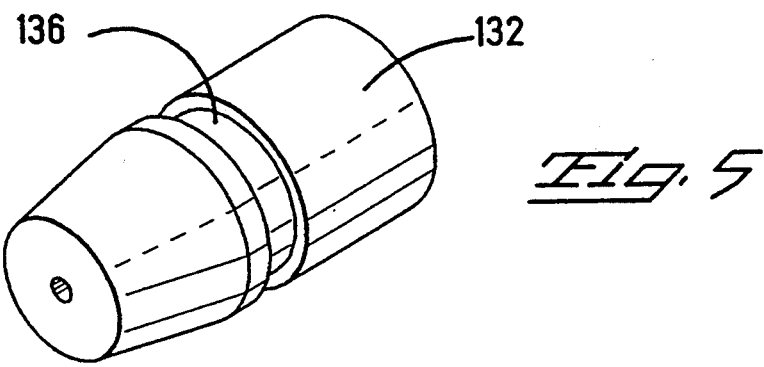
FIG. 5 is a perspective view of a second embodiment of the insert of the present invention.
Figure 6:
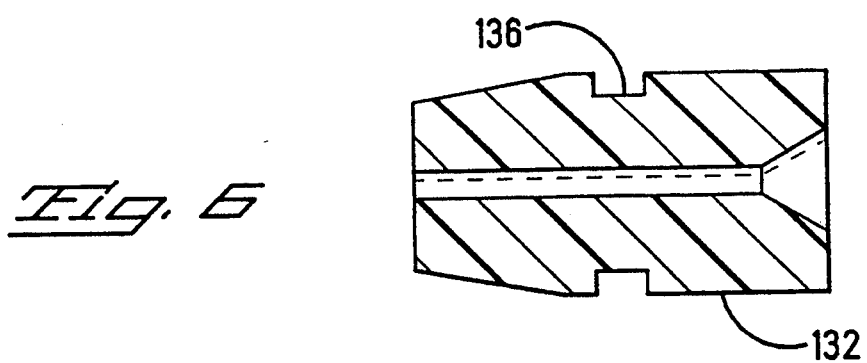
FIG. 6 is a cross-sectional view of the insert of FIG. 5.
Figure 7:
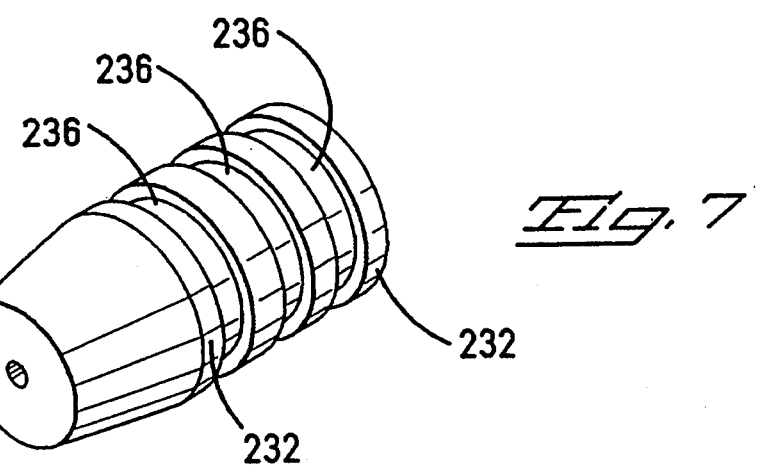
FIG. 7 is a perspective view of a third embodiment of the insert of the present invention.
Figure 8:
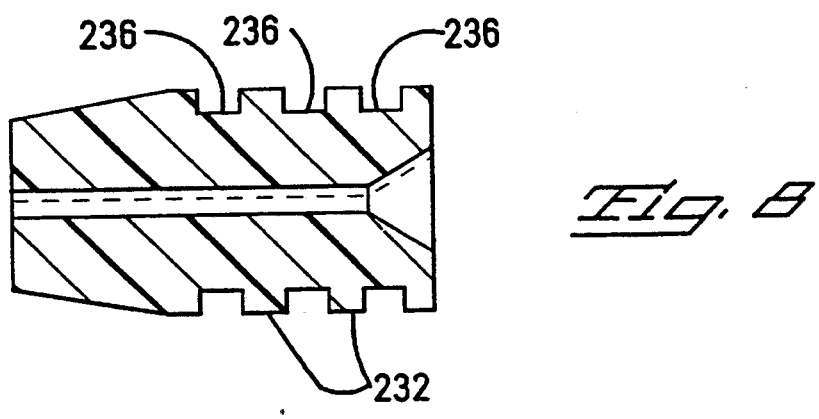
FIG. 8 is a cross-sectional view of the insert of FIG. 7.
Figure 9:
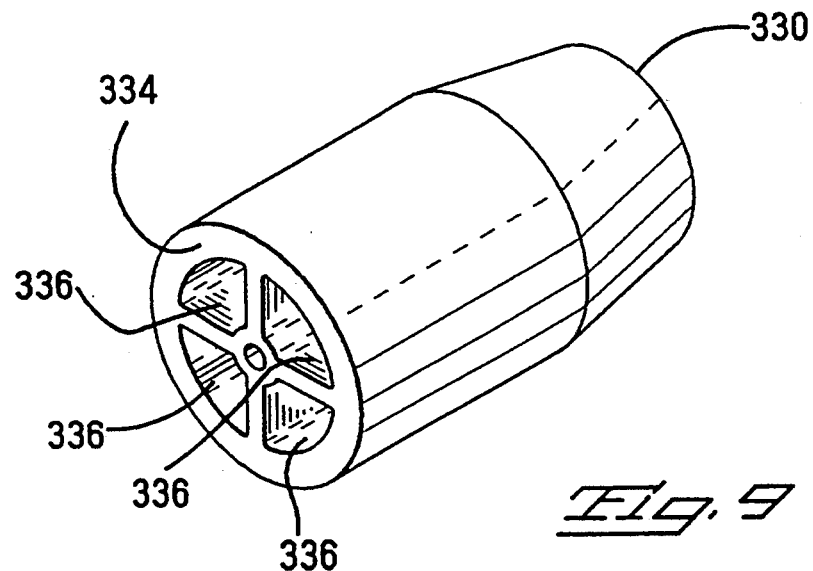
FIG. 9 is a perspective view of a forth embodiment of the insert of the present invention.
Figure 10:
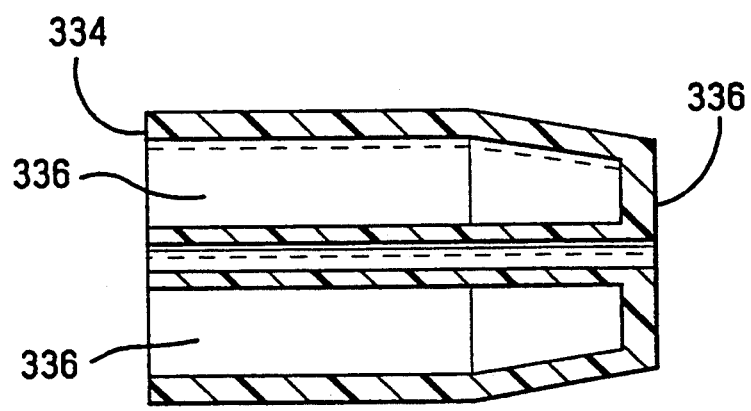
FIG. 10 is a cross-sectional view of the insert of FIG. 9.

The relief regions 36 are formed to compensate for the reduction in volume of the insert 10 as a result of the compaction by providing a deformable relief region 36 to control how much expansionary force may be exerted by the insert 10. As shown in FIG. 4, the insert 10 includes a relief region 36 extending along the cylindrical surface 32 and the frustoconical surface 28. In this embodiment, longitudinal channels, that are radially related to the fiber receiving bore 26 form the relief regions 36. FIGS. 5 and 6 show another embodiment of the present invention having an annular ring 136 in a cylindrical surface 132 as the relief region. FIGS. 7 and 8 show a further embodiment of the present invention having a plurality of annular rings 236 in a cylindrical surface 232 as the relief regions. FIGS. 9 and 10 show yet another embodiment of the present invention having blind tubular channels 336 extending from a rear end 334 towards the front end 330. These embodiments are illustrative and there are other possibilities that are within the envisioned scope of the invention which may be easily derived.

Figure 1:
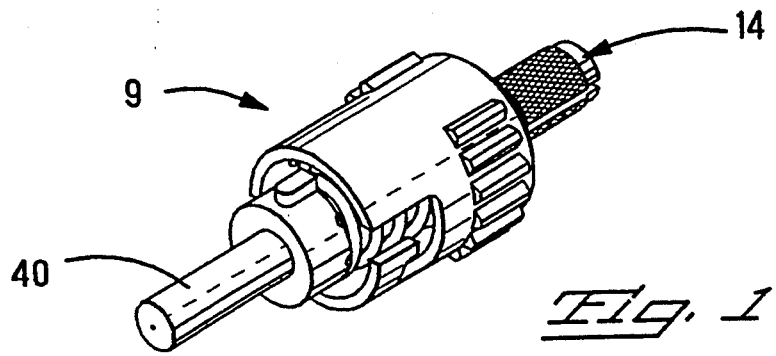
FIG. 1 is a perspective view of an optical fiber connector usable with the present invention.

With reference to FIGS. 1 and 2, there is shown one type of an optical fiber connector 9 that can be used with the present invention. This connector 9 is disclosed in U.S. Pat. No. 5,080,460 which is hereby incorporated by reference in its entirety. An optical fiber cable (not shown) includes an optical fiber 12 and a buffer covered optical fiber 13. The housing 14 has a front portion 40 intersecting a front face 42 and a stepped cylindrical rear portion 44 extending from the front portion 40 to a rear end 46. The housing 14 has an axial central passage 18 extending from the front face 42 to the rear end 46. A fiber receiving portion 50 extends concentrically with the front portion 40 and is sized to slidably receive the optical fiber 12. The fiber receiving portion 50 is in communication with a constricted portion 20, in turn communicating with a cylindrical portion 54 and being continuous with the passage portion 56 extending to the rear end 46.

The plunger 22 has a first outer diameter 58 sized to be closely received in a sliding relationship with the cylindrical portion 54 of the passage 18 of the housing 14 and a stepped outer diameter 60 having frictional surfaces 62a, 62b sized for fictionally engaging the passage portion 56 of the passage 18 of the housing 14 when the plunger 22 is force fit therein. Towards the rear end 46, a rear frictional surface 62a has a slightly larger diameter than intermediate frictional surfaces 62b. The plunger 22 has a passage 64 with a reduced diameter fiber receiving portion 66 at a front end 68 communicating with a buffer receiving portion 70 extending to a rear end 72 of the plunger 22. Multiple longitudinal slits 74 extend into the passage 64 along the rear frictional surface 62a through the rear end 72 to engage the buffer covered optical fiber 13 when the plunger 22 is force fit within the housing 14.

The plunger 22 is inserted into the passage 18 of the housing 14, in tandem with and behind the insert 10. The optical fiber 12 and the buffer covered portion of the optical fiber 13 are inserted along the passage 64 of the plunger 22. The optical fiber 12 projects forwardly and successively through the fiber receiving portion 66 of the plunger 22, the bore 26 of the insert 10 and fiber receiving portion 50 of the passage 18 of the housing 14 until the optical fiber 12 emerges from the fiber receiving portion 50 at the front face 42 of the housing 14 and the buffer covered fiber 13 reaches the bottom 71 of the passage 64 in the plunger 22.

The optical fiber 12 and the plunger 22 are then moved forwardly in tandem along the passage 18 of the housing 14, whereby the insert 10 is urged against the constriction 20 of the passage 18 as the plunger 22 is force fit into the housing 14. The insert 10 is compacted concentrically in the constriction 20 by forward movement of the plunger 22 within the ferrule 14. The compaction of the insert 10 results in a reduction in the diameter of the bore 26, thereby concentrically gripping the optical fiber 12 to radially align the fiber 12 within the ferrule 22.

When the insert 10 is compacted, the relief regions 36 are constructed to deform, as shown in FIG. 10 for the embodiment of FIG. 4. The regions 36 are sized and oriented to maintain the gripping and concentric disposition of the optical fiber 12 over the life of the connector 9, while limiting the expansionary force the insert 10 will exert on the housing 14. The energy stored within the insert 10 as the insert 10 is compacted is now directed to deforming these regions 36 in addition to pressing against the housing 14. The deformation of the relief region 36 results in volume compensation for the insert 10, whereby the insert 10 expands due to compaction but in a manner that does not direct the expansionary force against the housing 14. By limiting the magnitude of the expansionary force the insert 10 can exert, the material and dimensions of the housing 14 may be optimized.

Figure 11:
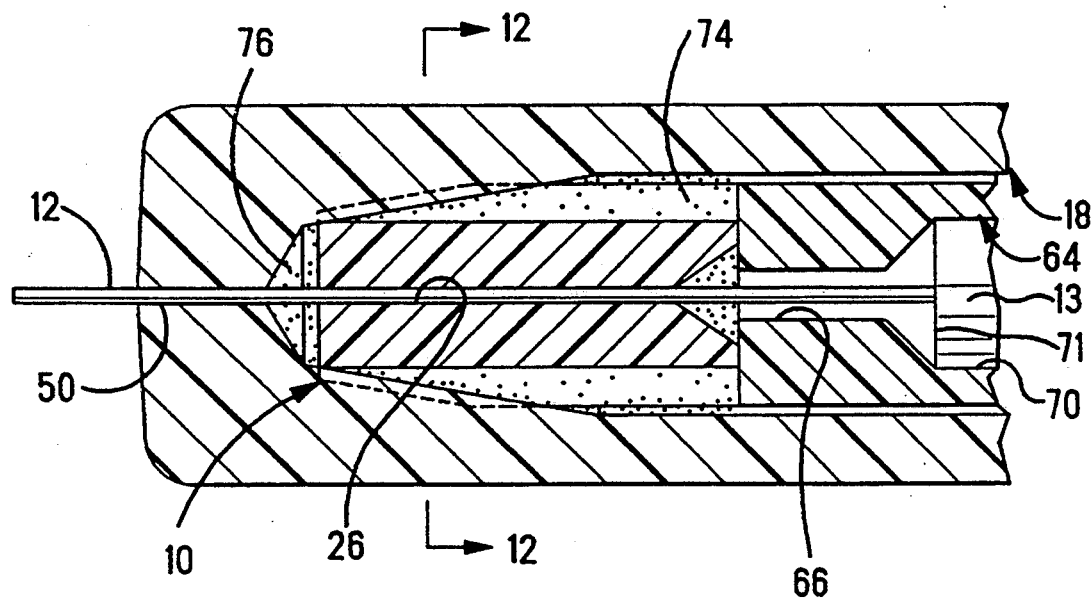
FIG. 11 is a side sectional view of the assembled connector of FIG. 2.
Figure 12:
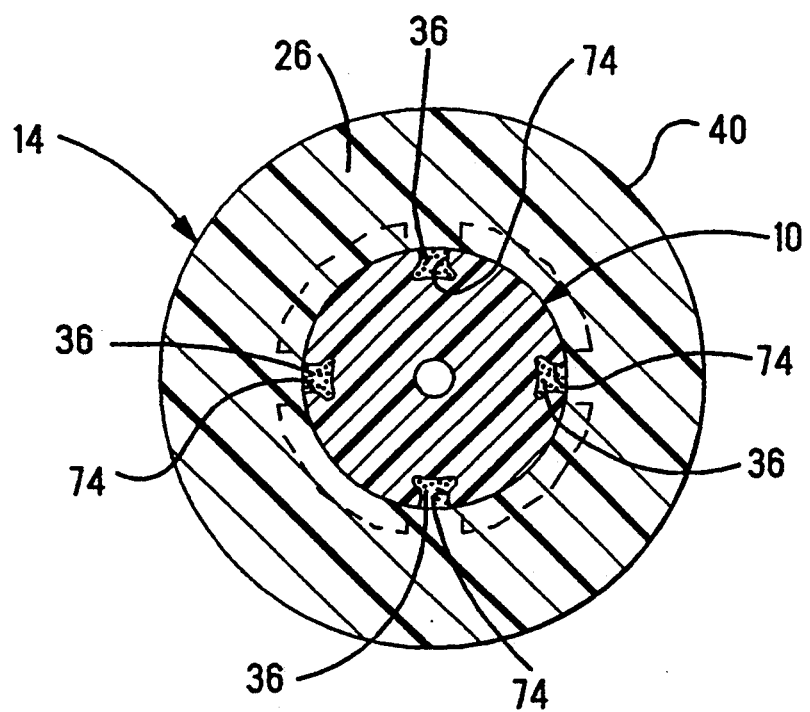
FIG. 12 is a sectional view taken along line 12—12 of FIG. 11.

Another aspect of the embodiment shown in FIG. 4 is that adhesive 74 may be used to provide improved retention of the fiber 12. This aspect provides the end user with the option of having the alignment advantages of the insert 10 combined with the fiber retention characteristics of an adhesive fiber connector. The adhesive 74 may be placed between the insert 10 and the plunger 22 as the connector 9 is assembled. Upon insertion of the plunger 22 to compact the insert 10, the plunger 22 forces the adhesive 74 along the longitudinal channels 36 of the insert 10 into a front region 76 of the constriction 20 to provide extra constraint of the optical fiber 12, as shown in FIGS. 10 and 11.

It will be appreciated that the present invention has significant advantages for the positioning and gripping an optical fiber. It should be recognized that the above-described embodiments, of the insert and the connector, constitute the presently preferred form of the invention and that the invention may take numerous other forms. Accordingly, the invention should be only limited by the scope of the following claims.

We claim:

1. An insert for securing an optical fiber within a housing when the insert is compacted within a passage of the housing between a constriction of the passage and a plunger movable within the passage, the insert comprising:

an elastic body having an aperture therethrough and a relief region wherein said relief region provides controlled expansionary forces of the elastic body when the elastic body is compacted within a constriction of the passage.

2. The insert of claim 1, wherein the relief region is an annular ring.

3. The insert of claim 1, wherein the relief region is a plurality of spaced apart annular rings.

4. The insert of claim 1, wherein the relief region is a longitudinal channel.

5. The insert of claim 1, wherein the body has an outer surface extending from a front end facing the constriction to a rear end facing the plunger and the relief region is a blind tubular channel extending from the rear surface towards the front surface between the bore and the outer surface.

6. The insert of claim 1, wherein the bore of the insert body is concentric with the outer surface, whereby the optical fiber is held concentric therewith.

7. The insert of claim 1, wherein the insert is formed of plastic.

8. An optical fiber connector for connecting an optical fiber to another optical device, the connector comprising:

an alignment ferrule having a front end and a rear end, the ferrule including a precision plug portion for aligning the fiber to the mating device, the plug having a concentric passage that includes a constriction and is open to the rear end;

a plunger within the passage constructed to receive an optical fiber and be movable within the passage towards the constriction; and an insert within the passage between the constriction and the plunger, the insert having an aperture therethrough for receiving the optical fiber in a sliding fit the insert further including a relief region for controlling expansionary forces exerted by the insert when the insert in compacted into the constriction by the plunger.

9. The connector of claim 8, wherein the insert has an outer surface concentric with the bore and the insert is constructed to concentrically compress onto the optical fiber.

10. The connector of claim 8, wherein the relief region is an annular ring.

11. The connector of claim 8, wherein the relief region is a plurality of annular rings.

12. The connector of claim 8, wherein the relief region is a longitudinal channel.

13. The connector of claim 12, wherein the insert has a front end facing the constriction, a rear end facing the plunger, and the longitudinal channel extends from the rear end to the front end.

14. The connector of claim 13, further including adhesive between the insert and the plunger, which as the insert is compacted, flows along the longitudinal channel forward of the insert.

* * * * *